(12) United States Patent
Godlewski

(10) Patent No.: US 7,689,478 B2
(45) Date of Patent: Mar. 30, 2010

(54) INVENTORY MANAGEMENT SYSTEM AND METHOD

(75) Inventor: Peter Godlewski, San Clemente, CA (US)

(73) Assignee: Nexiant, Lake Forest, CA (US)

( * ) Notice: Subject to any disclaimer, the term of this patent is extended or adjusted under 35 U.S.C. 154(b) by 755 days.

(21) Appl. No.: 11/165,391

(22) Filed: Jun. 23, 2005

(65) Prior Publication Data

US 2006/0293978 A1 Dec. 28, 2006

(51) Int. Cl.
*G06Q 10/00* (2006.01)
(52) U.S. Cl. ......................................................... 705/28
(58) Field of Classification Search .................. 705/28; 340/1
See application file for complete search history.

(56) References Cited

U.S. PATENT DOCUMENTS

| | | | | |
|---|---|---|---|---|
| 5,963,134 | A * | 10/1999 | Bowers et al. | 340/572.1 |
| 6,993,501 | B1 * | 1/2006 | Zhao | 705/28 |
| 7,055,741 | B2 * | 6/2006 | Bong et al. | 235/382.5 |
| 7,324,966 | B2 * | 1/2008 | Scheer | 705/28 |
| 7,426,484 | B2 * | 9/2008 | Joyce et al. | 705/28 |
| 2002/0105425 | A1 | 8/2002 | Holmes | |
| 2002/0107744 | A1 | 8/2002 | Rosenberg et al. | |
| 2005/0216366 | A1 * | 9/2005 | Vincent et al. | 705/28 |
| 2006/0085297 | A1 * | 4/2006 | Minerley | 705/28 |
| 2006/0106684 | A1 * | 5/2006 | Aoki et al. | 705/28 |

OTHER PUBLICATIONS

Avery, Susan. "Tool dispenser eases cost of MRO buying." Purchasing Jan. 11, 1996: ABI/INFORM Global, ProQuest. Web. Oct. 22, 2009.*
Virtual Crib, Controlled Access and Dispensing Brochure in one page.

* cited by examiner

*Primary Examiner*—Oluseye Iwarere
(74) *Attorney, Agent, or Firm*—Knobbe, Martens, Olson & Bear, LLP

(57) ABSTRACT

An inventory management system preferably including a supply crib configured to store a plurality of supply items. The supply crib has a controlled entryway to selectively permit access to the supply crib. A database contains inventory information relating to a quantity of each of the plurality of supply items allocated to the supply crib. A user terminal is capable of communicating with the database and is accessible from external the supply crib. The user terminal is configured to permit a user of the system to select a quantity of a desired item from the plurality of supply items within the crib. The system is configured to update the inventory information to reflect the addition or removal of the quantity of the desired item in response to the user initiating a door transaction, which preferably is either or both of an access request to the supply crib or entry into the supply crib by the user.

24 Claims, 3 Drawing Sheets

INVENTORY MANAGEMENT SYSTEM AND METHOD

BACKGROUND OF THE INVENTION

1. Field of the Invention

The present invention relates to inventory management systems. More specifically, the present invention relates to a system and method for automatically updating inventory level information in response to transactions involving the removal or addition of inventory items from a inventory supply location.

2. Description of the Related Art

A variety of systems are used to track inventory levels and determine a need to reorder one or more supply items. Some of these systems are significantly manual in nature, involving a designated person(s) responsible for dispensing inventory items, as well as ordering and receiving new shipments of inventory items. Such systems having a significant manual component involve undesirable labor costs and are subject to human error. Other systems are highly automatic and may involve dispensing machines that dispense inventory items and automatically track inventory usage and levels. However, such automatic systems may be expensive both initially, as well as being expensive to maintain and reconfigure as inventory needs change. Therefore, in some applications, highly automatic systems may be undesirable.

An inventory management system common to manufacturing environments is the use of a secure location in which inventory supply items are stored. These locations are often referred to as "cribs." In a common arrangement, the crib is manned by an attendant responsible for dispensing supply items and receiving new shipments of supply items. The attendant usually enters the transactions into a computer inventory system, either manually or through the use of scanning technology, such as a barcode reader, for example.

However, the inventory systems that utilize supply cribs typically also suffer from disadvantages. For example, in many instances the crib is centrally located within a facility and users must often travel a significant distant from their work area to the crib without knowing if the desired item is in stock within the crib. Furthermore, providing an employee to attend the crib increases labor costs and, because entry of the inventory transactions into the inventory system are often accomplished manually, the probability of introducing errors into the inventory system are increased.

SUMMARY OF THE INVENTION

Preferred embodiments of the present system and method permit users to search the inventory of one or more supply cribs from a location remote from the supply crib. Preferably, the system and method includes utilizing a user terminal accessible from outside the supply crib to generate a requisition list for one or more desired supply items. Once a list of desired items is completed, the system provides authorization for the user to access the crib (or cribs) in which the desired items are located. Optionally, the system may print a list of the selected items for reference by the user. Preferably, the user proceeds to one of the cribs where the desired items are located and accesses the crib. Desirably, the system updates the inventory information to reflect the removal or addition of the desired items associated with the particular supply crib once the supply crib has been accessed by the user. In one arrangement, the system may include a local user terminal to permit a user to select additional supply items while present in a particular supply crib.

One aspect of a preferred embodiment involves an inventory management system, including a plurality of supply cribs, each supply crib comprising a controlled access entry and an interface configured to permit input of a user identification. The system is configured to permit entry into the supply crib in response to an appropriate entry request. A server includes a database having inventory information related to a quantity of supply items allocated to each of the plurality of supply cribs. The server is configured for communication with the interface. At least one user terminal is accessible from external the supply cribs and is capable of communication with the server. The user terminal is configured to permit a user to create a pending transaction by identifying a quantity of each of one or more desired supply items. The user terminal is also configured to communicate the pending transaction to the server. The system grants authorization for the user to access an appropriate one or more of the supply cribs in response to the creation of the pending transaction. The server receives notification of input of user identification into the interface of a selected one of the plurality of supply cribs by the user and updates the inventory information with respect to the one or more desired supply items allocated to the selected supply crib in response to at least one of the input of user identification or entry of the user into the selected supply crib.

Another aspect of a preferred embodiment is an inventory management system including a supply crib configured to store a plurality of supply items. A controlled entryway includes a door configured to selectively permit access through the entryway and a sensor arrangement configured to sense a door transaction. The door transaction comprises at least one of an entry request and an opening of the door by a user. A database contains inventory information relating to a quantity of each of the plurality of supply items allocated to the supply crib. A user terminal is capable of communicating with the database and is accessible from external the supply crib. The user terminal is configured to permit a user of the system to select a quantity of a desired item from the plurality of supply items. The system updates the inventory information to reflect the addition or removal of the quantity of the desired item in response to the user initiating the door transaction.

Yet another aspect of a preferred embodiment is a method of managing inventory, including providing a database having inventory information related to a quantity of a plurality of supply items allocated to one or more controlled access supply cribs. The method also includes providing at least one user terminal accessible from external the one or more supply cribs. At least one user terminal is capable of communicating with the database and is configured to permit a user to select a quantity of a desired item from the plurality of supply items. The method further includes updating the inventory information in the database to reflect the addition or removal of the quantity of the desired item when the user accesses a particular supply crib associated with the desired item.

BRIEF DESCRIPTION OF THE DRAWINGS

These and other features, aspects and advantages of the present inventory management method and system are described below with reference to drawings of a preferred embodiment, which is intended to illustrate but not to limit the invention. The drawings contain three figures.

DETAILED DESCRIPTION OF THE PREFERRED EMBODIMENT

Figure 1:
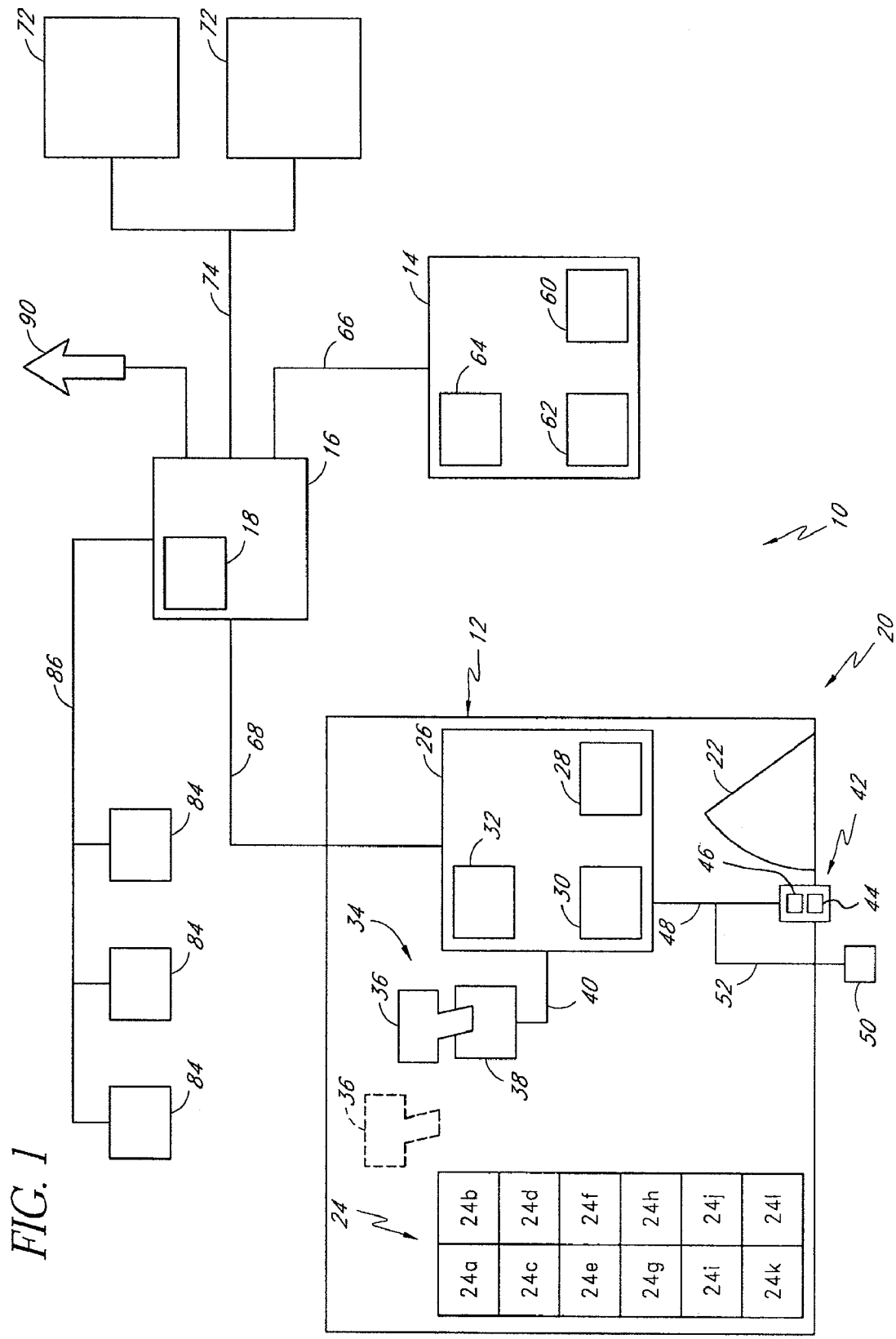
FIG. 1 is a schematic illustration of an inventory management system incorporating certain features, aspects and advantages of a preferred embodiment of the present invention.

FIG. 1 is a schematic illustration of an inventory management system 10, which is configured to facilitate accurate and economical tracking of inventory levels of supply items. Preferably, the system 10 includes a facility for storing supply items, such as a supply crib 12. In addition to the crib 12, the system 10 preferably includes a user terminal 14 that is accessible from outside the crib 12. In one preferred arrangement, the user terminal 14 is located at a remote location from the crib 12. Desirably, the system 10 also includes a computer server 16, which is configured to store inventory information in a database 18. The database 18 preferably includes various types of information relating to the supply items allocated to the crib 12 (referred to herein as "inventory information").

As described above, a preferred facility for storing the supply items is the supply crib 12, which in one preferred arrangement is an enclosed area with a controlled access entryway 20. The controlled access entry 20 preferably includes a door 22 which may be locked and selectively unlocked to inhibit or permit, respectively, a user of the system 10 to enter the crib 12. Although such an enclosed, secured structure is preferred, in alternative arrangements the crib 12 may be unsecured. For example, the crib 12 may be an unlocked storage room or simply a designated storage area.

Within the supply crib 12, preferably a storage area 24 is provided and configured to store one or more supply items. The illustrated storage area 24 is divided into a plurality of individual storage sections 24A-24L, each of which preferably are configured to store one or more of a plurality of supply items. The individual storage locations 24A-24L may include individual shelves of a shelving system, individual bins placed within a shelving system, lockers, designated areas or any other suitable storage structures or designations. The supply items stored within the storage area 24 may be consumable supplies, such as machine tools (e.g., drill bits, cutting inserts), electrical components, office supplies, for example. The supply items may also include reusable supplies or tools. In addition, the system 10 may be adapted for use with any other desired items for which management of inventory levels is desired.

Preferably, within the interior of the supply crib 12 is provided a system computer 26. The system computer 26 preferably is configured to permit a user of the system 10 to select desired supply items from the crib 12, or elsewhere within the system 10, as is described in greater detail below. In the illustrated arrangement, the system computer 26 includes a user interface 28, such as a keyboard, mouse and computer screen combination or touch screen, for example. Desirably, the system computer 26 also includes a printer 30 that, if desired, may be configured to print a hardcopy list of requested items for reference by the user. In one arrangement, the system computer 26 may include a local database 32 similar to the database 18. The local database 32 may be altered directly by a user manipulating the user interface 28 of the system computer 26 and may transmit such information to the database 18 of the server 16 on a periodic basis or in response to a specific event, such as access to the crib 12, for example. Alternatively, the server 16 may poll the system computer 26 on a periodic basis in order to update the database 18 to reflect changes to inventory information within the local database 32 since the last polling. The server 16 may also be configured to permit on demand polling of the system computer 26.

Preferably, the system 10 includes a local input device 34 configured to permit a user of the system 10 to quickly and easily identify and select desired items from within the crib 12. In the illustrated arrangement, the input device 34 includes a portable scanner 36 and a docking station 38. Preferably, the scanner 36 may be removed from the docking station 38 and used to scan a bar code label associated with any one of the plurality of storage locations 24A-24L. The scanner 36 may transmit directly, or through the docking station 38, information relating to the items located within the storage locations 24A-24L scanned by a user to the system computer 26. The transmission of information from the scanner 36 to the system computer 26 may happen immediately upon scanning or may occur after the scanner 36 is replaced to the docking station 38.

The docking station 38 may also be used to recharge the power supply of the scanner 36, if necessary. The scanner 36 may be of any suitable construction to permit the input of information relating to the supply items located in one or more of the storage locations 24A-24L. For example, although bar code scanning may be preferred in some arrangements, other suitable methods for inputting supply item information may also be used. Preferably, the docking station 38 communicates with the system computer 26 through an appropriate communication link 40, which may be a hardwired link, wireless connection or a combination thereof. In one arrangement, the scanner 36 may also include a user interface and permit a user to identify and select desired items from the system 10. For example, the scanner 36 may be a PDA (personal digital assistant) or other similar device.

Preferably, the supply crib 12 includes a door control device 42 associated with the door 22 of the supply crib 12. The door control device 42 preferably includes a door latch 44 and a door sensor 46. The door latch 44 preferably is electronically controlled to selectively latch or unlatch the door 22. The door sensor 46 preferably is configured to determine if the door 22 is open or closed and send an appropriate signal to the system to indicate the status of the door 22. Preferably, the door control device 42 communicates with the system 10 and, specifically, the system computer 26 through an appropriate communication connection 48, such as a wireless connection, hardwired connection or a combination thereof, for example.

The illustrated system 10 also includes an identification interface 50 accessible from outside the supply crib 12 and configured to permit the input of user identification. The identification interface 50 preferably communicates with the system 10 and, specifically, the system computer 26 through an appropriate communication connection 52. The identification interface 50 may be of any suitable construction to permit a user to input a user identification into the system 10. For example, the identification interface 50 may be an ID card reader or other input device, such as a keyboard and computer screen. Other suitable arrangements may also be used such as systems using biological parameters for identification (e.g., fingerprint, retina scan, etc.).

As described above, the user terminal 14 preferably is accessible from external the supply crib 12. More preferably, the user terminal 14 is located remotely from the supply crib 12 and, desirably, is located to be conveniently accessible to a number of users. In one arrangement, the user terminal 14 is a dedicated component of the system 10 used primarily, or entirely, for the inventory functions of the system 10. However, in other arrangements, the user terminal 14 may be a multifunctional component, such as a personal computer located at the working location of a system user. Preferably, the user terminal includes a user interface 60, which may be of any suitable arrangement to permit a user to interact with the system 10. For example, the user interface 60 may be a keyboard, mouse and computer screen combination. If desired, the computer screen may enable touch screen functions.

Desirably, the user terminal 14 also includes a printer 62, which is capable of printing a list of selected items for a particular transaction for reference by the user. As is described in greater detail below, a user may utilize the user terminal 14 to select one or more desired supply items recognized by the system 10, preferably using the user interface 60. The system 10 may utilize the printer 62 to print a requisition list of the selected items for a reference by the user. The list may include additional information relating to the selected items, such as the quantity selected and item location, for example but without limitation.

In one arrangement, the user terminal 14 may include a local database 64, which is configured to contain information related to the supply items recognized by the system 10. The local database 64 receives and records changes in inventory resulting from transactions made by a user through the user terminal 14 and transmits the changes to the inventory information to the database 18 as desired, and preferably at specific intervals. Transmission of inventory information from the local database 64 may occur when the user logs out of the user terminal 14 or may occur in response to polling by the server 16. In addition or in the alternative, transmission of information between the local database 64 and the database 18 of the server 16 may occur in accordance with other desired protocols.

In a preferred arrangement, the server 16 is the manager of the system 10. The database 18 of the server 16 preferably is the primary database regarding inventory levels within the system 10. Thus, the database 18 receives information from the local databases 32 and 64 of the supply crib 12 and user terminal 14, respectively. Communication between the user terminal 14 and the server 16 preferably takes place over a suitable communication connection 66. The communication connection 66 may be a hardwired connection, a wireless connection or a combination thereof, for example. Communication between the system computer 26 of the supply crib 12 and the server 16 preferably occurs over a similarly suitable communication connection 68, which also may be a hardwired connection, a wireless connection or a combination thereof. The connections between various components of the system 10 may comprise internet connections to facilitate convenient access to the system 10 by a number of additional computers.

In some arrangements, the system 10 may include additional supply cribs 72. The supply cribs 72 preferably are the same as, or similar to, the supply crib 12 and may be provided at different spaced locations within a facility, or even within separate facilities. The additional supply cribs 72 preferably communicate with the server 16 over a suitable communication connection 74. Thus, the server 16 manages inventory information for multiple supply cribs 12, 72.

In addition, the system 10 may also include additional user terminals 84. The user terminals 84 preferably communicate with the server 16 over a suitable communication connection 86. The additional user terminals 84 preferably are configured to permit a user of the system 10 to identify desired items recognized by the system 10. The additional user terminals 84 may be substantially similar to the user terminal 14 or may be multifunctional terminals, such as a personal computer, personal digital assistant, telephone or other suitable device.

In some applications, it may be desirable for the system 10 to communicate with additional components or systems, as indicated by the arrow 90. Such additional components or systems 90 may include additional internal computer systems, or outside systems. For example, some outside systems may include supplier systems, such that orders may be placed directly with suppliers by the system 10. In addition, it may be desirable for the system 10 to communicate with a third party inventory management service, which may function as an intermediary between the system 10 and outside suppliers. Furthermore, the system 10 may communicate with other supply service systems, as desired.

Advantageously, the illustrated system permits a user to search for and select items from a plurality of supply cribs 12, 72. To increase convenience for the user, the searching and selection of items may be performed from a number of user terminals 14, 84, including terminals 14, 84 that may be located at the desk or other workstation of the user. Preferably, the user terminal 14, 84 is capable of printing a list of selected items for the user. The user may then go to the appropriate crib (or cribs) 12, 84 in which the desired items are located. The user may enter the particular crib 12 and may request entry by entering user identification into the identification terminal 50. The previously-described crib 12 is used herein for the purpose of providing an example. Preferably, use of the additional cribs 72 is similar to the use of crib 12.

If access is granted, the user may open the door 22 and enter the crib 12. The entry of user ID or the opening of the door 22 may be considered a "door transaction." In response to the door transaction, preferably, the system 10 updates the inventory to reflect an addition or removal of the items selected by the user. The use of a door transaction to initiate an update of the inventory information within the system 10 is preferred because such an arrangement requires little participation from the user and is, therefore, believed to promote user compliance. That is, it is believed that the user will select each desired item with the user terminal 14 and, once permitted access to the crib 12, will take or return only the selected items. Systems that require significant participation from the user or involving a significant number of process steps, tend to encourage users to bypass the system, if possible. If additional item(s) are desired, a user can conveniently select additional the additional item(s) via the local system computer 26 from within the crib 12.

Figure 2:
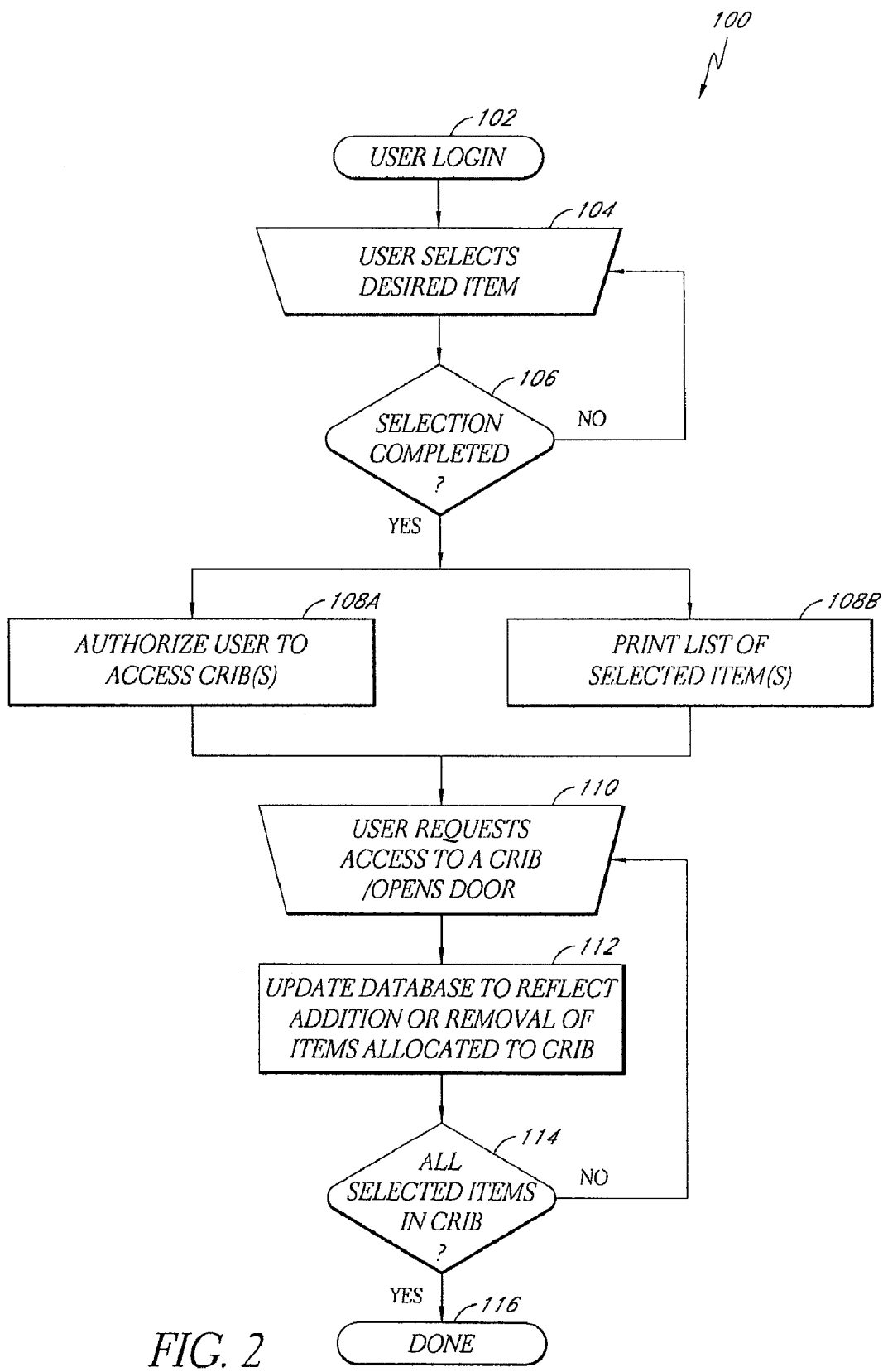
FIG. 2 is a flow diagram of a preferred operational sequence of the system of FIG. 1.

FIG. 2 is a flow diagram of a preferred operation sequence of the system 10 of FIG. 1. Although such an operation sequence is preferred, other suitable operational sequences of the system 10 may also be employed. In addition, not all operation steps are necessarily illustrated. That is, additional steps may be added or illustrated steps may be omitted in an individual application of the operational sequence.

At block 102 of the illustrated operational sequence 100, the user logs into the system 10. Log in may occur through the user interface 60 of the user terminal 14, as described above. Alternatively, log in may be accomplished through appropriate interfaces of the user terminals 84 or by any other suitable method.

Once logged in, the user selects a desired item, preferably from a list of inventory items, at block 104. The selection of the desired item preferably is accomplished through the user interface 60 of the user terminal 14 or through the appropriate interface of one of the alternative user terminals 84. Selection of a desired item, or items, may include item(s) that the user wishes to retrieve from one of the cribs 12, 72 or item(s) that the user wishes to replace to one of the cribs 12, 72. In addition, the system 10 may be configured to permit the special order of an item that is not presently located within one of the cribs 12, 72, as described in greater detail below.

At block 106, the system 10 inquires as to whether the selection of items has been completed. If the user indicates that the selection is not completed, the operational sequence 100 returns to block 104, wherein the user may select additional items.

Returning to block 106, if the user indicates that the selection of items has been completed, the sequence moves to block 108A and 108B. At block 108A, the system 10 authorizes the user to access the crib, or cribs 12, 72, in which the selected item(s) are located. At block 108B, the system 10 may optionally print a list of the selected items at the printer 62 of user terminal 14, or other appropriate printer (not shown) at one of the alternative terminals 84. The activities of block 108A and 108B may occur in any desired order or may occur simultaneously.

At block 110, the user requests access to a crib 12, 72, preferably using the identification interface 50 of the crib 12 or a similar interface of the cribs 72. Once access is permitted, preferably the user opens the door 22 to the crib 12. The opening of the door 22 is communicated to the system by the door sensor 46 over the communication connection 48. As described above, either or both of the entry of user identification or opening of the door 22 may be considered as a door transaction.

In response to a door transaction, the operational sequence 100 moves to block 112, wherein preferably the database 18 is updated to reflect the addition or removal of items allocated to the crib 12, 72 accessed by the user. Initially, the local database 32 may be updated in response to and the changes transmitted to the database 18 of the server 16 at a later time or, alternatively, the database 18 may be updated in response to, or soon after, the door transaction.

At block 114 of the operational sequence 100, the system 10 determines if additional items are located in another crib 12, 72 or if all of the items on the user list are located in the crib 12, 72 accessed by the user. If the answer is no, indicating that additional items are located in other cribs 12, 72, the operational sequence 100 moves to block 110 and waits for the user to request access and/or open the door 22 of another crib 12, 72.

In response to the query at block 114, if all the listed items are in the crib 12, 72 accessed by the user the process flow moves to block 116. At block 116, the system 10 determines that the pending transaction has been completed. To select additionally desired items, the user preferably begins with logging into the system 10 via the user terminal 14 or one of the alternative terminals 84 and follows the operational sequence 100 described immediately above.

Figure 3:
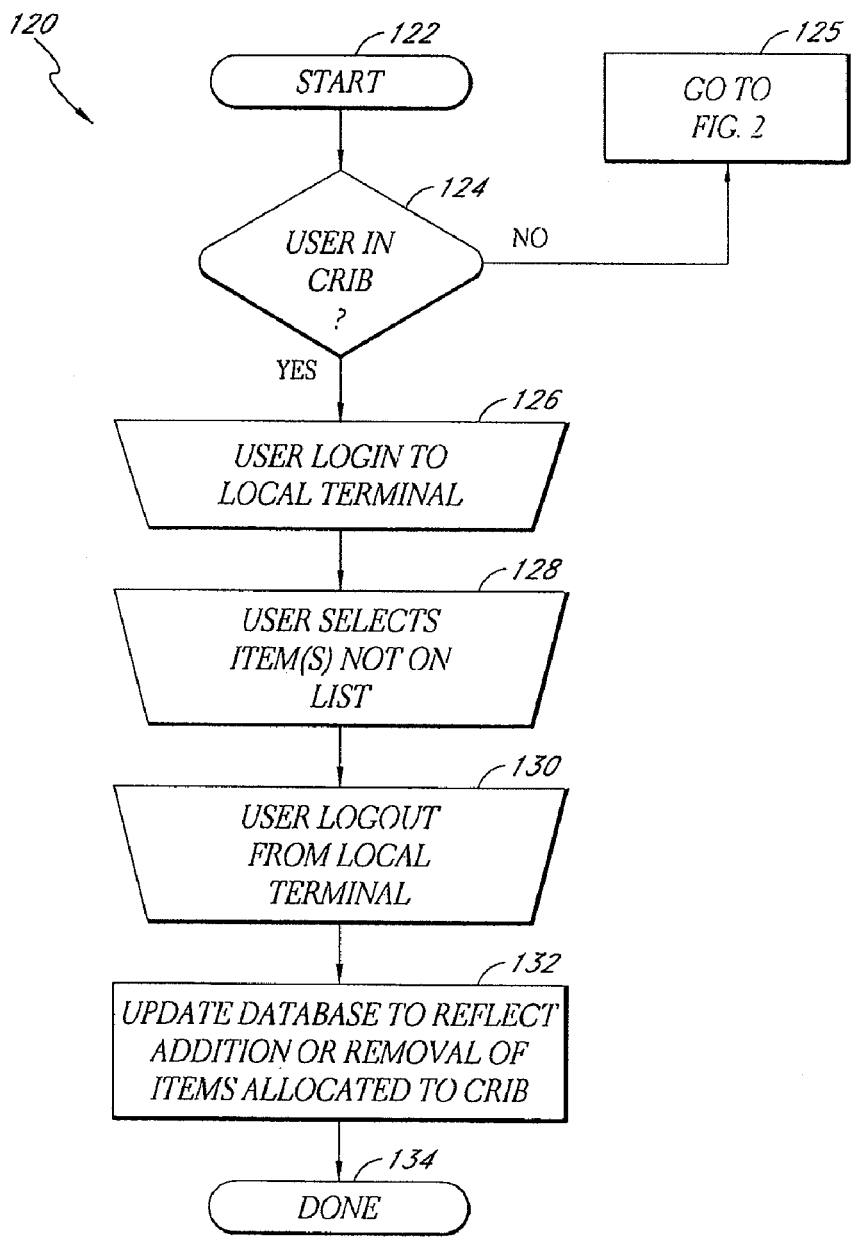
FIG. 3 is a flow diagram of a preferred operational sequence to permit a user to select additional items once the user is present within one of the supply cribs.

FIG. 3 is a process flow diagram of a preferred operational sequence 120 of the system 10 to manage inventory when a user is present within a supply crib 12, 72. For example, in some instances, the user may determine that additional items are desired after a pending transaction has been initiated through the user terminal 14 or alternative terminal 84. In such a situation, it is desirable to permit the user to select additional items once inside a crib 12, 72 in order to encourage compliance with the inventory management system 10. The operational sequence 120 begins at block 122.

The operational sequence 120 initially moves to block 124, wherein the system 10 determines if the user is within a crib 12, 72. If in response to the query at block 124, the user is not within a crib 12, 72, the sequence 120 moves to block 125 and then proceeds with the operation sequence 100, as described above with reference to FIG. 2. The system 10 may determine whether the user is within a crib 12, 72 by determining the location of the user terminal. If the user terminal is one of the external terminals 14, 84, the system 10 may determine that the user is not within a crib 12, 72. Other suitable methods of determining whether a user is within or external to a crib 12, 72 may also be used.

If the response to the query at block 124 is yes, the operational sequence preferably moves to block 126. At block 126, the user logs in to a local terminal 26 that is location within one of the cribs 12, 72. Logging on to the local terminal 26 may occur by any suitable methods, such as the methods described above, for example.

The operational sequence 120 moves to block 128 wherein the user selects items that are not on a user list provided by the printer 62 of terminal 14, or a similar printer of an alternative terminal 84, if applicable. The user may then select the desired items, preferably by a method as described above utilizing the user interface 28 of the system computer 26 or the scanner 36 of the selection device 34.

Once the desired items have been selected, the operational sequence 120 moves to block 130 wherein the user logs out from the local terminal 26. The logout may be done manually by the user or in response to a timeout signal indicating that no activity has been taken by the user in a predetermined amount of time. The system 10 may infer that the user has left the crib 12, 72 in response to the timeout determination. Other methods of manual or automatic logout may also be used. For example, logout may occur when it is determined that the user has exited the crib 12, 72, as indicated by a signal originating from the door control device 42.

Once logout has occurred from the local terminal 26, the operational sequence 120 moves to block 132 wherein the database 18 is updated to reflect the addition or removal of the items selected locally, that is, from within the crib 12, 72. As described above, the local database 32 may be updated initially and the inventory information subsequently transmitted to the database 18 of the server 16. Alternatively, the database 18 may be updated directly.

Once updating of the database 18 has occurred, the system moves to block 134 wherein the operational sequence 120 is considered finished. To select additionally desired items, the user preferably begins with logging into the system 10 via the user terminal 14 or one of the alternative terminals 84 and follows the operational sequence 100 described above.

Advantageously, the illustrated inventory management system 10 is capable of managing inventory information in an accurate manner and promotes user compliance because it is straightforward to use and does not require a user to complete an excessive number of steps. Because access to the supply cribs is dependent, in a preferred arrangement, on the creation of a pending transaction, the present system 10 ensures compliance with respect to at least the items selected prior to access to the crib. Furthermore, the provision of a local interface within the crib further promotes compliance with respect to items that are desired after a pending transaction is created. That is, the user does not have to return to a remote user terminal to select additional items after a pending transaction is created.

Furthermore, the system 10 preferably utilizes a supply that is similar to the crib systems common in many business environments, including manufacturing facilities in particular. Accordingly, the system 10 may be applied to existing cribs without excessive cost. In addition, the system 10 eliminates the need for inventory tracking devices associated with the individual storage locations of the supply items, such as weighing scales, manual input buttons, or secured doors, all of which are common in existing inventory systems and all of which complicate reconfiguration of storage locations. The preferred embodiments of the present system 10 update inventory information based on user access to the supply crib, or similar storage location. Accordingly, the system 10 may accommodate reconfiguration of the crib or storage location, as desired, without resulting in significant costs to reconfigure the system 10, itself.

Although this invention has been disclosed in the context of a preferred embodiment and examples, it will be understood by those skilled in the art that the present invention extends beyond the specifically disclosed embodiment to other alternative embodiments and/or uses of the invention and obvious modifications and equivalents thereof. In particular, while the present inventory management system has been described in the context of a particularly preferred embodiment, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety combination and sub-combinations of the features and aspects can be made and still fall within the scope of the invention. Thus, it is intended that the scope of the present invention herein disclosed should not be limited by the particular disclosed embodiment described above, but should be determined only by a fair reading of the claims.

What is claimed is:

1. An inventory management system, comprising:
   a plurality of supply cribs, each supply crib comprising a controlled access entry and an interface configured to permit input of a user identification, said system configured to permit entry into said supply crib in response to an appropriate entry request;
   a server comprising a database having inventory information related to a quantity of supply items allocated to each of said plurality of supply cribs, said server configured for communication with said interface;
   at least one user terminal accessible from external said plurality of supply cribs and capable of communication with said server, said user terminal configured to permit a user to create a pending transaction by identifying a quantity of each of one or more desired supply items, said user terminal also configured to communicate said pending transaction to said server, said user terminal being separate and remote from said interfaces of said plurality of supply cribs;
   wherein said system grants authorization for said user to access an appropriate one or more of said supply cribs in response to said creation of said pending transaction, and wherein said server receives notification of input of user identification into said interface of a selected one of said plurality of supply cribs by said user and updates said inventory information with respect to said one or more desired supply items allocated to said selected supply crib in response to at least one of said input of user identification or entry of said user into said selected supply crib.

2. The system of claim 1, wherein said inventory information is updated in response to said entry into said selected supply crib by said user.

3. The system of claim 2, wherein said entry is determined to have occurred when said user opens a door of said selected supply crib.

4. The system of claim 1, wherein said interface comprises an ID card reader.

5. The system of claim 1, wherein said interface comprises a keyboard and computer screen.

6. The system of claim 1, wherein said at least one user terminal includes a printer configured to print a list of items in said pending transaction.

7. The system of claim 1, wherein said at least one user terminal communicates with said server over a computer network.

8. The system of claim 1, wherein said at least one user terminal comprises a computer that is not dedicated for use with said system.

9. The system of claim 1, wherein said at least one user terminal comprises at least one terminal dedicated for use with said system and at least one terminal not dedicated for use with said system.

10. The system of claim 1, wherein said system is configured such that said user may select a special order item from said database that is not located in any one of said plurality of supply cribs at the time of said selection, and wherein said special order item is subsequently delivered to one of said plurality of supply cribs.

11. An inventory management system, comprising:
    a supply crib configured to store a plurality of supply items;
    a controlled entryway comprising a door configured to selectively permit access through said entryway and a sensor arrangement configured to sense a door transaction, said door transaction comprising at least one of an entry request and an opening of said door by a user, said controlled entryway further comprising an interface configured to permit input of a user identification, said entry request comprising said user's entry of said user identification into said interface;
    a database containing inventory information relating to a quantity of each of said plurality of supply items allocated to said supply crib;
    a user terminal capable of communicating with said database, said user terminal accessible from external said supply crib, said user terminal configured to permit a user of said system to select a quantity of a desired item from said plurality of supply items, said user terminal being separate and remote from said interface;
    wherein said system updates said inventory information to reflect the addition or removal of said quantity of said desired item in response to said user initiating said door transaction.

12. The system of claim 11, wherein said sensor arrangement comprises a door sensor configured to determine if said door is open.

13. The system of claim 12, wherein said door transaction comprises opening of said door by said user.

14. The system of claim 11, wherein said door transaction comprises said entering of said user identification by said user.

15. The system of claim 11, wherein said system is configured such that said user may select a special order item from said database that is not located in any one of said plurality of supply cribs at the time of said selection, and wherein said special order item is subsequently delivered to said supply crib.

16. A method of managing inventory, comprising:
    providing a database comprising inventory information related to a quantity of a plurality of supply items allocated to one or more controlled access supply cribs, each of said one or more controlled access supply cribs comprising an interface configured to permit input of a user identification, said system configured to permit entry into an associated one of said one or more controlled access supply cribs in response to an appropriate entry request;

providing at least one user terminal accessible from external said one or more supply cribs, said at least one user terminal capable of communicating with said database and configured to permit a user to select a quantity of a desired item from said plurality of supply items, said at least one user terminal being separate and remote from the interfaces of said one or more controlled access supply cribs;

updating said inventory information in said database to reflect the addition or removal of said quantity of said desired item when said user accesses a particular supply crib associated with said desired item.

17. The method of claim 16, wherein said accessing said particular supply crib comprises entering said user identification into the interface associated with said particular supply crib.

18. The method of claim 16, wherein said accessing said particular supply crib comprises opening a door to said particular supply crib.

19. The method of claim 16, wherein said providing at least one user terminal comprises providing a plurality of user terminals.

20. The method of claim 16, wherein said at least one user terminal communicates with said database over an internet connection.

21. The method of claim 16, additionally comprising permitting said user to select a special order item that is not located within any of said supply cribs at the time of said selection, and subsequently delivering said special order item to one of said supply cribs.

22. The method of claim 16, wherein said user selects multiple items, said method comprising printing a list of said selected items at said at least one user terminal.

23. The method of claim 16, additionally comprising providing a local terminal within said particular supply crib, said local terminal configured to permit said user to select an additional desired item after said user is within said particular supply crib and said system configured to update said database to reflect the addition or removal of said additional desired item.

24. The system of claim 1, wherein said at least one user terminal is configured to permit said user to search for said one or more desired supply items.

* * * * *